United States Patent
Matsumoto

(10) Patent No.: US 7,653,231 B2
(45) Date of Patent: Jan. 26, 2010

(54) IMAGE PROCESSING METHOD AND COMPUTER READABLE MEDIUM

(75) Inventor: Kazuhiko Matsumoto, Minato-ku (JP)

(73) Assignee: Ziosoft, Inc., Tokyo (JP)

( * ) Notice: Subject to any disclaimer, the term of this patent is extended or adjusted under 35 U.S.C. 154(b) by 655 days.

(21) Appl. No.: 11/415,680

(22) Filed: May 2, 2006

(65) Prior Publication Data

US 2007/0008318 A1    Jan. 11, 2007

(30) Foreign Application Priority Data

Jul. 6, 2005    (JP)    ............................. 2005-197655

(51) Int. Cl.
    *G06K 9/00* (2006.01)
(52) U.S. Cl. .................. 382/131; 345/653; 345/424
(58) Field of Classification Search ................. 345/419, 345/424
    See application file for complete search history.

(56) References Cited

U.S. PATENT DOCUMENTS

| | | | |
|---|---|---|---|
| 5,172,419 A * | 12/1992 | Manian | 382/132 |
| 5,431,161 A * | 7/1995 | Ryals et al. | 600/425 |
| 6,556,697 B1 * | 4/2003 | Bruder et al. | 382/131 |
| 6,970,594 B2 * | 11/2005 | Williams | 382/154 |
| 7,310,095 B2 * | 12/2007 | Matsumoto | 345/419 |
| 7,424,140 B2 * | 9/2008 | Matsumoto | 382/128 |
| 2005/0151731 A1 * | 7/2005 | Matsumoto | 345/419 |
| 2006/0007244 A1 * | 1/2006 | Matsumoto | 345/619 |
| 2006/0056681 A1 * | 3/2006 | Matsumoto | 382/154 |
| 2006/0123266 A1 * | 6/2006 | Matsumoto | 714/1 |
| 2006/0221074 A1 * | 10/2006 | Matsumoto | 345/424 |
| 2007/0098299 A1 * | 5/2007 | Matsumoto | 382/284 |

* cited by examiner

*Primary Examiner*—Anand Bhatnagar
*Assistant Examiner*—Avinash Yentrapati
(74) *Attorney, Agent, or Firm*—Pearne & Gordon LLP

(57) ABSTRACT

An image processing method is provided capable of improving a response to a user in a case where a series of images using volume data are displayed by volume rendering. When the images are displayed by animation in an oscillating manner with amplitude, the amplitude is gradually increased so as to spare time for image generation. That is, when the user specifies a parameter value, for example, a projection angle (initial value: $\theta=0°$), for an object to be diagnosed, animation display of images C, D, and E of the object is performed with a small amplitude ($\theta=\pm5°$) with the initial value as a center. During the animation display, an image B ($\theta=-10°$) and an image F ($\theta=10°$) are calculated in the background. After the calculation is completed, the amplitude is increased ($\theta=\pm10°$) and animation display of the images B, C, D, E, and F is performed.

15 Claims, 12 Drawing Sheets

● (A,B,C,D,E,F,G): NEWLY GENERATED IMAGE IS DISPLAYED
○ (A',B',C',D',E',F',G'): CACHED IMAGE IS DISPLAYED

● (A,B,C,D,E,F,G): NEWLY GENERATED IMAGE IS DISPLAYED

○ (A',B',C',D',E',F',G'): CACHED IMAGE IS DISPLAYED

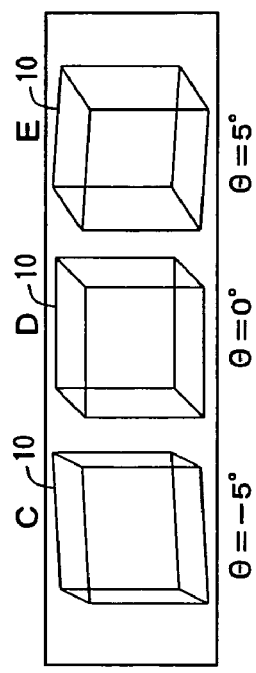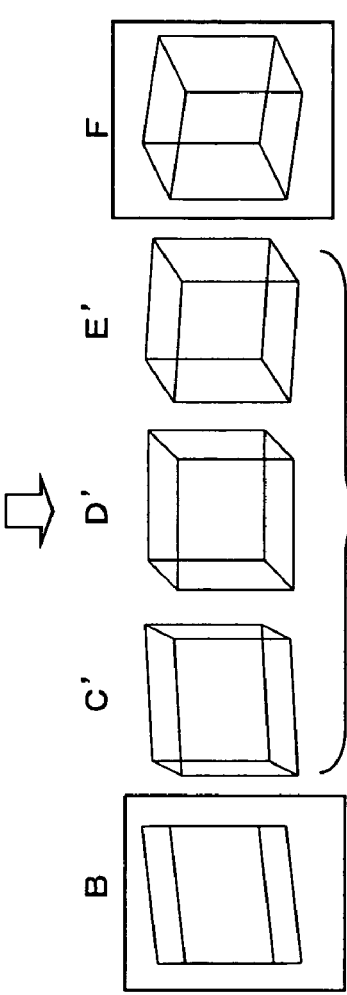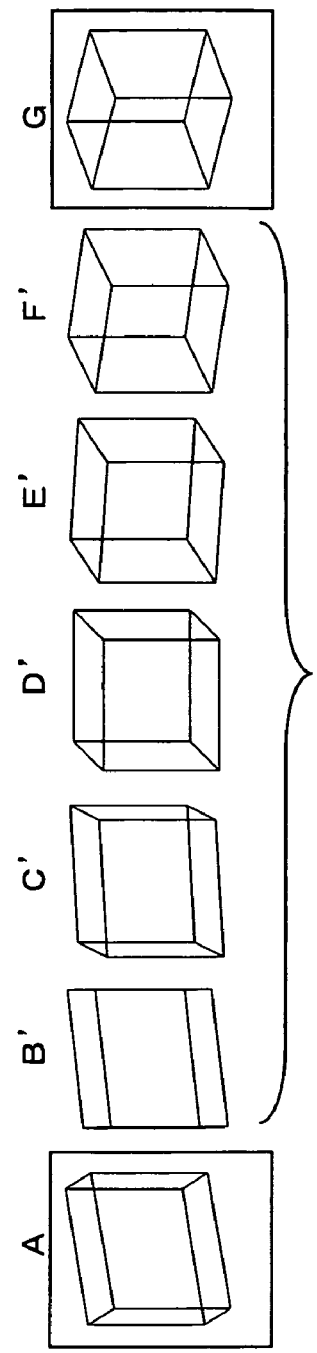
FIG. 3A
FIG. 3B
FIG. 3C

● (A,B,C,D,E,F,G): NEWLY GENERATED IMAGE IS DISPLAYED

○ (A',B',C',D',E',F',G'): CACHED IMAGE IS DISPLAYED

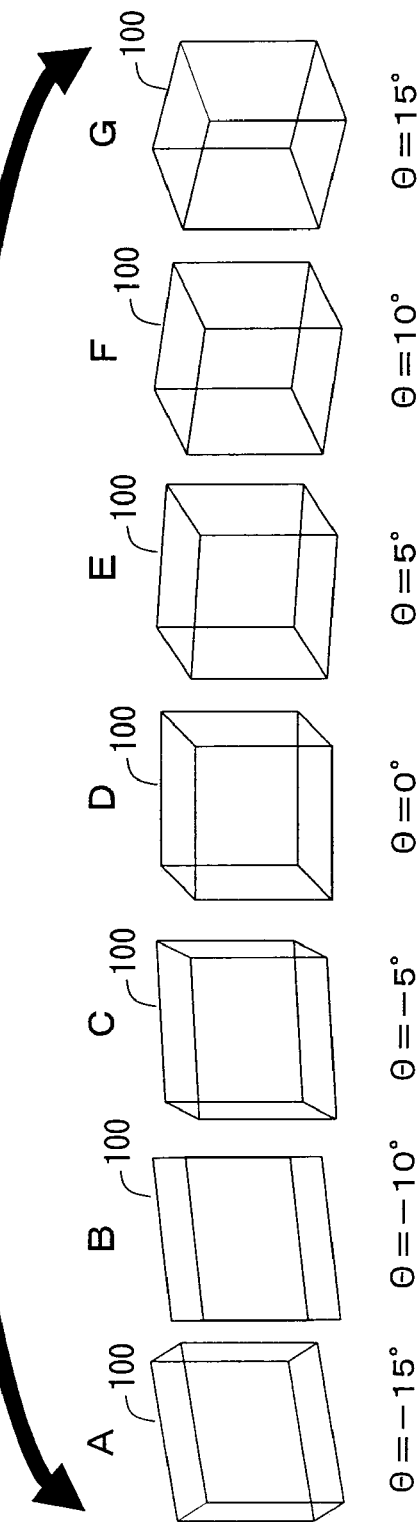
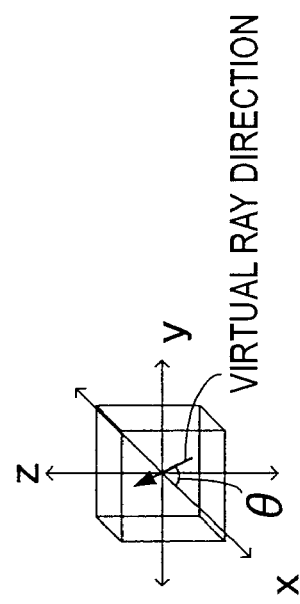
FIG. 11 PRIOR ART that is specified by the user.
IMAGE PROCESSING METHOD AND COMPUTER READABLE MEDIUM This application claims foreign priority based on Japanese Patent application No. 2005-197655, filed Jul. 6, 2005, the contents of which is incorporated herein by reference in its entirety.

BACKGROUND OF THE INVENTION

1. Field of the Invention

The present invention relates to an image processing method and a computer readable medium for displaying a series of images using volume data.

2. Description of the Related Art

The medical field is revolutionized by the advent of CT (computed tomography) and MRI (magnetic resonance imaging), which enabled direct observation of the internal structure of a human body with progress in image processing technique using a computer. As a result, medical diagnosis using a tomogram of a living body is widely practiced. Furthermore, in recent years, volume rendering is used in medical diagnosis as a technique for visualizing a three-dimensional internal structure of a human body which is too complicated to understand with only tomograms. Volume rendering is a technique by which an image of a three-dimensional structure is directly rendered from volume data, which are three-dimensional digital data of an object obtained by CT, for example.

As three-dimensional image processing using the volume data, ray casting, MIP (Maximum Intensity Projection), MinIP (Minimum Intensity Projection), MPR (Multi Planar Reconstruction), and CPR (Curved Planar Reconstruction) are generally used. Further, a 2D slice image, etc., is generally used as two-dimensional image processing using the volume data.

FIG. 11 is a schematic representation in the MIP processing, in a case where a three-dimensional object 100 is swung from side to side and displayed so as to make it easy to determine an anteroposterior positional relationship of the three-dimensional object 100 as an observation object. The MIP processing is a method of the three-dimensional volume rendering, and in the MIP processing, rendering is performed based on a maximum value of the volume data on a virtual ray.

Usually, in the MIP processing, a virtual ray is projected onto the three-dimensional object 100 as the observation object from a direction that a user specifies, and the three-dimensional object 100 is displayed as an image D ($\theta=0°$). In this case, in the MIP processing, as a bright portion (maximum value) is displayed and objects positioned in front and at the back of the bright portion are not displayed, depth information is not represented.

Consequently, a parameter value, which is a virtual ray (camera) direction, is changed by 5° at a time from $\theta=-15°$ to $\theta=15°$, for example, whereby the three-dimensional object 100 is displayed as from an image A to an image G. Then, the images provided by oscillating the virtual ray (camera) direction from side to side and changing the parameter value within a range from $\theta=-15°$ to $\theta=15°$ are displayed sequentially. Such image processing is called a tumbler display function in the medical diagnosis using volume rendering images.

Hitherto, in such image processing, data within a maximum amplitude ($\theta=\pm15°$) are sequentially calculated and displayed, and the calculation results that are once displayed are cached. After that, animation display is performed at high speed using the cache.

FIG. 12 is a schematic representation showing timings of displaying newly generated images and cached images. The horizontal axis indicates a projection angle of the virtual ray, and the vertical axis indicates time when the image is displayed. As shown in FIG. 12, in the related art, image data A, B, C, D, E, F, and G within the maximum amplitude ($\theta=\pm15°$) are sequentially calculated and displayed. Thus, it takes a long time to calculate all the images. On the other hand, as the calculated image data A, B, C, D, E, F, and G are stored in a cache, after that, animation display is performed at high speed using the cache.

However, in the image processing method in the related art described above, it is required to calculate images at all angles within the maximum amplitude that is specified by the user. Therefore, a problem arises that time $\Delta t1$ taken to perform the first animation display is long.

For example, in a case where the medical diagnosis using images from the CT apparatus is conducted, it may take several ten seconds to calculate a plurality of images by the tumbler function with the angle that the user specifies as the center. Particularly, when the specified angle is changed or a scale factor of the image is changed, the user needs to wait for a long time.

SUMMARY OF THE INVENTION

It is an object of the invention to provide an image processing method and a computer readable medium capable of improving a response to a user in a case where a series of images using volume data are displayed.

In some implementations, an image processing method of the invention comprises: setting a reference value of a parameter value for displaying an image; changing the parameter value based on the reference value; and sequentially displaying the image corresponding to the changed parameter value, the image being generated by volume rendering using volume data that is specified by the changed parameter value, wherein the parameter value is changed by being increased or decreased periodically based on the reference value, with an amplitude of the parameter value from the reference value being gradually increased.

According to the image processing method of the invention, the image corresponding to the reference value and the image corresponding to the parameter value that is close to the reference value are generated in priority to other images, and a range (the amplitude) of the parameter value is gradually widened, whereby a response to the user can be improved. For example, in displaying a series of images provided by changing a projection angle (parameter) in a range of $-15°$ to $15°$, the image corresponding to the projection angle $0°$ which has high importance is generated at first, and then the images corresponding to the projection angles $5°$, $-5°$, $10°$, $-15°$, $15°$, and $-15°$ are generated sequentially, whereby the image having high importance for the user can be generated in priority to other images.

In the image processing method of the invention, when the image corresponding to the changed parameter value is stored in a storage, the stored image is displayed, and when the image corresponding to the changed parameter value is not stored in the storage, the image corresponding to the changed parameter value is generated, displayed and stored in the storage.

According to the image processing method of the invention, the stored images are displayed, whereby the animation display can be performed at high speed.

In the image processing method of the invention, a plurality of variables depends on the parameter value.

In the image processing method of the invention, the parameter value is a projection angle of a virtual ray in the volume rendering.

In the image processing method of the invention, the parameter value is a projection position from which a virtual ray is projected in the volume rendering.

In the image processing method of the invention, the projection position is a view point that moves along on a set path.

In the image processing method of the invention, the parameter value determines an opacity function in ray casting method.

In the image processing method of the invention, the parameter value determines a color LUT (Look-Up Table) function in ray casting method.

In the image processing method of the invention, the parameter value determines at least one of a window width value and a window level value being used for an image calculation in MIP (Maximum Intensity Projection) method, MinIP (Minimum Intensity Projection) method, raysum method, or average value method.

In the image processing method of the invention, the parameter value is a combining ratio of a fusion image.

In the image processing method of the invention, while the stored image is displayed, the next image to be created is generated and stored in advance, the next image corresponding to the parameter value further being changed. According to the image processing method of the invention, a new image is generated in parallel with the image display, whereby the user need not wait until each image is generated, unlike in the related art. Thus, a series of images can be displayed without giving a sense of discomfort to the user.

In the image processing method of the invention, the image generation is stopped by an instruction from a user. According to the image processing method of the invention, image calculation for the image generation is stopped by the instruction from the user, whereby waste of time by an image generation that is unnecessary for the user can be prevented.

In the image processing method of the invention, a plurality of the images is generated in parallel based on the respective parameter values. In the image processing method of the invention, the reference value is set by a user.

In some implementations, a computer readable medium having a program including instructions for permitting a computer to perform image processing, the instructions comprise: setting a reference value of a parameter value for displaying an image; changing the parameter value based on the reference value; and sequentially displaying the image corresponding to the changed parameter value, the image being generated by volume rendering using volume data that is specified by the changed parameter value, wherein the parameter value is changed by being increased or decreased periodically based on the reference value, with an amplitude of the parameter value from the reference value being gradually increased.

BRIEF DESCRIPTION OF THE DRAWINGS

FIGS. 3A to 3C are conceptual drawings to describe an image display method according to a first example of the invention.

FIG. 11 is a schematic representation in MIP processing, in a case where a three-dimensional object 100 is swung from side to side and displayed so as to make it easy to determine an anteroposterior positional relationship of the three-dimensional object 100 as an observation object.

DESCRIPTION OF THE PREFERRED EMBODIMENTS

FIGS. 1A to 1F are conceptual drawings to describe an image display method according to an embodiment of the invention. In the following description, an image display method is shown in which an amplitude is gradually increased when a series of images using volume data are displayed by animation in a oscillating manner.

Figure 1B:
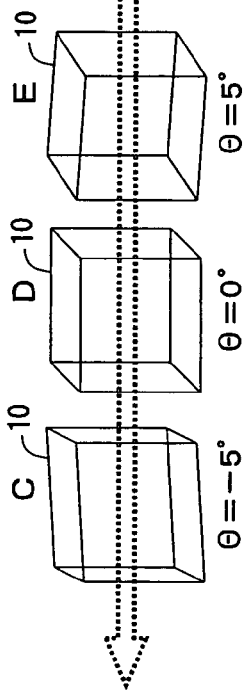
FIGS. 1A to 1F are conceptual drawings to describe an image display method according to an embodiment of the invention.
Figure 1D:
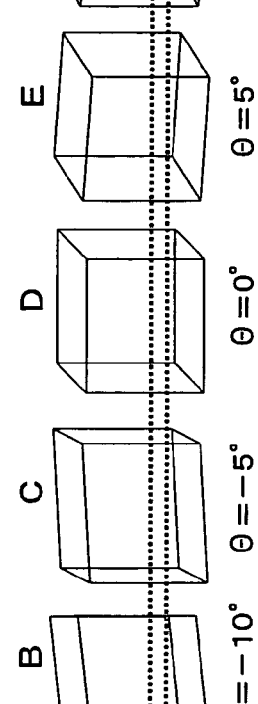
Figure 1F:
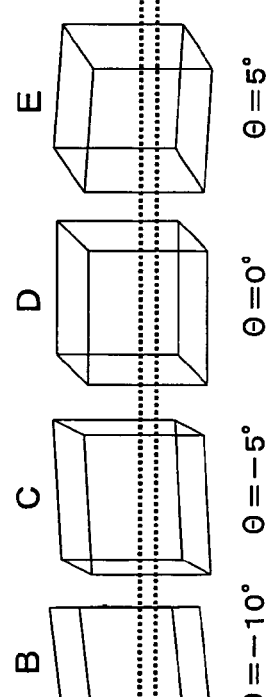
Figure 1A:
Figure 1C:
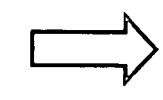
Figure 1E:

When a user specifies a parameter value, for example, a projection angle (initial value: $\theta=0°$), for an object 10 as a diagnosing object, animation display of images C, D, and E of the object 10 as the diagnosing object are performed within a small amplitude ($\theta=\pm5°$) with the user-specified projection angle as a center, as shown in FIG. 1A and FIG. 1B. Next, while the animation display of the images C, D, and E are performed, an image B ($\theta=-10°$) and an image F ($\theta=10°$) as shown in FIG. 1D are calculated in a background. After the calculation is completed, the amplitude is increased ($\theta=\pm10°$) as shown in FIG. 1C, and the animation display of the diagnosing object is performed with images B, C, D, E, and F. Further, while the animation display of the images B, C, D, E, and F are performed, an image A ($\theta=-15°$) and an image G ($\theta=15°$) as shown in FIG. 1F are calculated in the background. After the calculation is completed, the amplitude is further increased ($\theta=\pm15°$) as shown in FIG. 1E, and the animation display of the diagnosing object is performed with images A, B, C, D, E, F, and G.

Thus, according to the embodiment, in order to calculate an important center portion ahead, the image corresponding to the parameter value as a reference ($\theta=0°$) and the image corresponding to the parameter value that is close to the reference parameter value are generated in priority to other images. Then, a range of the parameter value for the image display is gradually widened. Accordingly, a response to the user can be improved.

Figure 2:
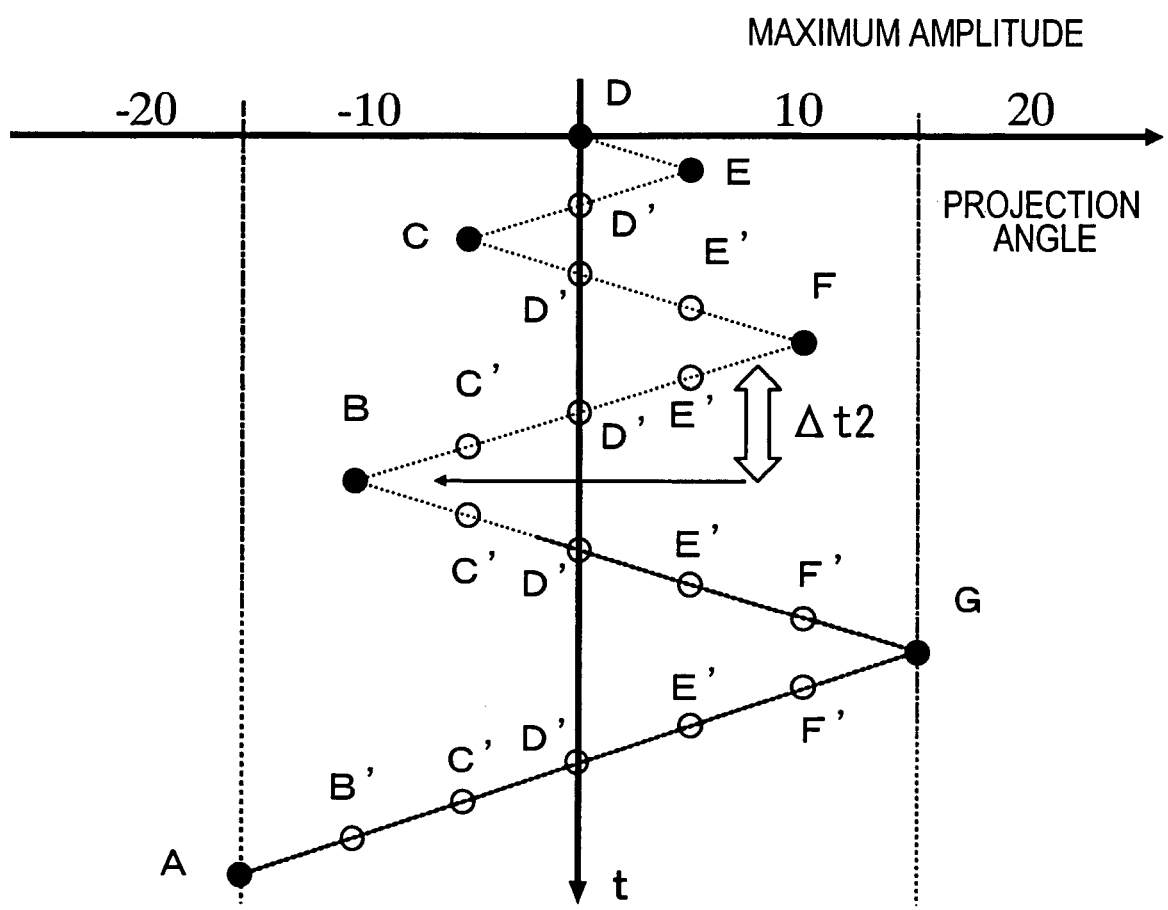
FIG. 2 is a drawing to describe processing timings of an image processing method of an embodiment.

FIG. 2 is a drawing to describe processing timings of the image processing method of the embodiment. It shows a case where the parameter value (projection angle) is changed with maximum amplitude $-15°$ to $15°$. In the embodiment, new images maybe generated in order of (5°: image E), ($-5°$: image C), (10°: image F), ($-10°$: image B), (15°: image G), and (−15°: image A) (black circles in FIG. 2), with the user-specified angle (θ=0°: image D) as the center.

In this case, the first animation display is performed with images E, D' (cached image: white circle), and C, and then animation display of images C, D', E', and F is performed. Then, the animation display of images F, E', D', C', and B is performed. In this case, the new image B can be generated during time Δt2 in which the cached images E', D', and C' are displayed. Accordingly, the time in which the animation display of the cached images is performed can be used effectively.

Thus, according to the image processing method of the embodiment, the images close to the user-specified center value, which are most important for the user, are generated and displayed in priority to other images. Further, the new image can be calculated while cached images are displayed (Δt2), so that the response to the user can be improved.

Since the image corresponding to the specified angle is displayed in priority to other images, the observation object can be diagnosed rapidly. Moreover, when the angle is changed or a scale factor is changed, the user need not wait until all images within the maximum amplitude are displayed, and a usability of the user in the image diagnosis can be improved.

FIRST EXAMPLE

FIGS. 3A to 3C are conceptual drawings to describe an image display method according to a first example of the invention. The example provides an image processing method of displaying a series of images using volume data specified by projection angle θ as a parameter value. The projection angle θ is increased or decreased periodically with respect to a reference value, and the amplitude is gradually increased for sequentially generating the images corresponding to the projection angles θ respectively.

For example, when the series of images provided by changing the projection angle θ in a range of −15° to 15° are displayed, an image D which corresponds to the reference projection angle θ=0° which has great importance for the user is generated, displayed, and stored in a cache. Then, an image E corresponding to the projection angle θ=5° is generated, displayed, and stored in the cache. Next, a cached image D' is displayed and an image C corresponding to the projection angle θ=−5' is generated, displayed, and stored in the cache.

Next, cached images D' and E' are displayed, and an image F corresponding to the projection angle θ=10° is generated, displayed, and stored in the cache. Next, cached images E', D', and C' are displayed, and mean while an image B corresponding to the projection angle θ=−10° is generated, displayed, and stored in the cache.

Likewise, while cached images C', D', E', and F' are displayed, an image G corresponding to the projection angle θ=15° is generated and displayed. While cached images F', E', D°, C', and B' are displayed, an image A corresponding to the projection angle θ=−15° is generated and displayed.

According to the described configuration, the image corresponding to the reference projection angle (θ=0°) and the image corresponding to the projection angle that is close to the reference projection angle are generated in priority to other images. Then, a range of the projection angle for the image display is gradually widened. Accordingly, the response to the user can be improved.

In the example, when the generated image is stored in the cache and the image corresponding to the specified projection angle is stored in the cache, the corresponding image stored in the cache is displayed. When the corresponding image is not stored in the cache, the corresponding image is generated and its animation display is performed. Accordingly, the important portion that the user specifies can be displayed at high speed.

In the example, while the images stored in the cache are displayed, an image corresponding to the next projection angle is generated in advance and stored in the cache. As a new image is generated in parallel with the display of the images, the user need not wait until each image is generated as in the related art, and the series of images can be displayed without giving a sense of discomfort to the user.

SECOND EXAMPLE

Figure 4:
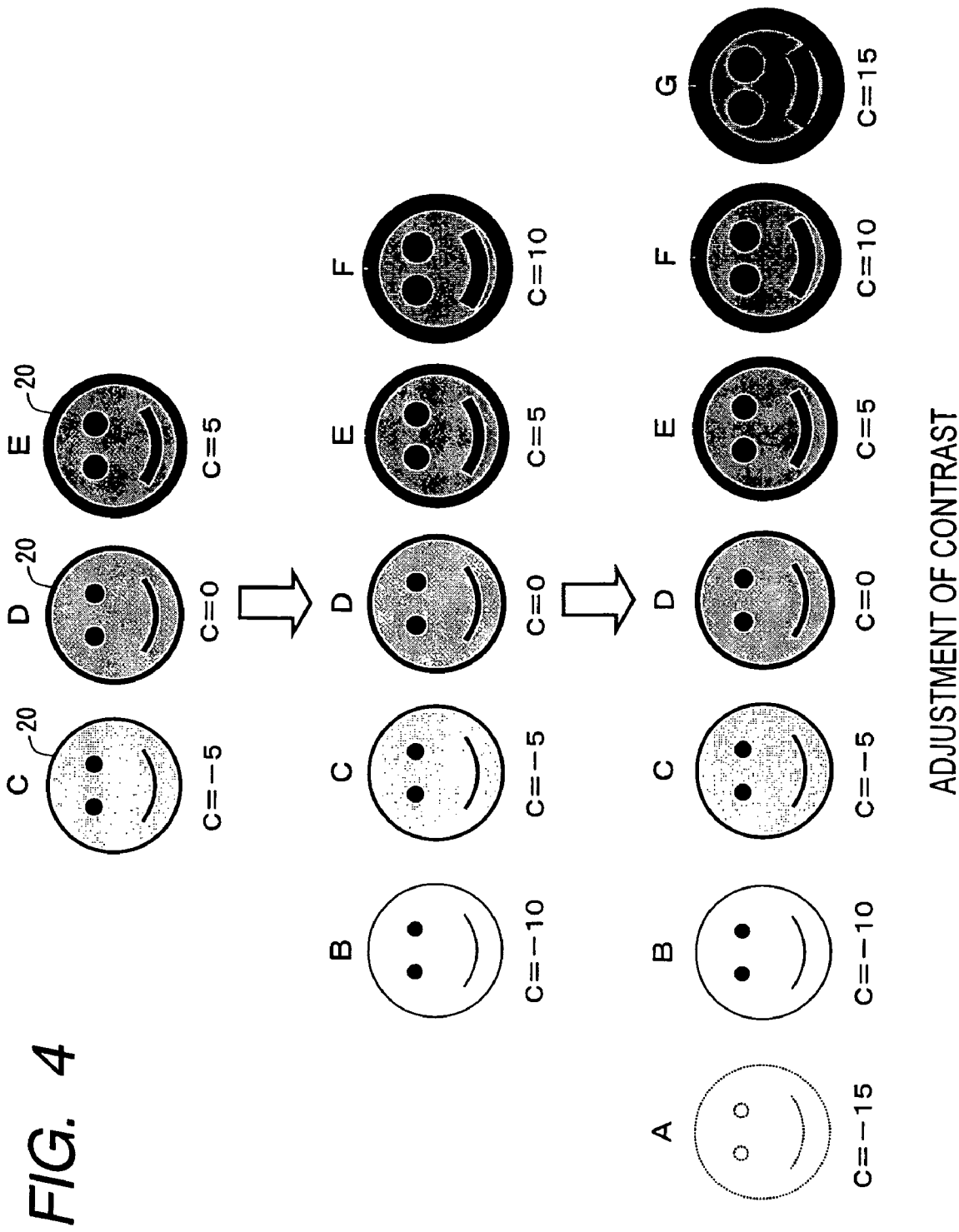
FIG. 4 is a conceptual drawing to describe an image display method according to a second example of the invention.
Figure 5:
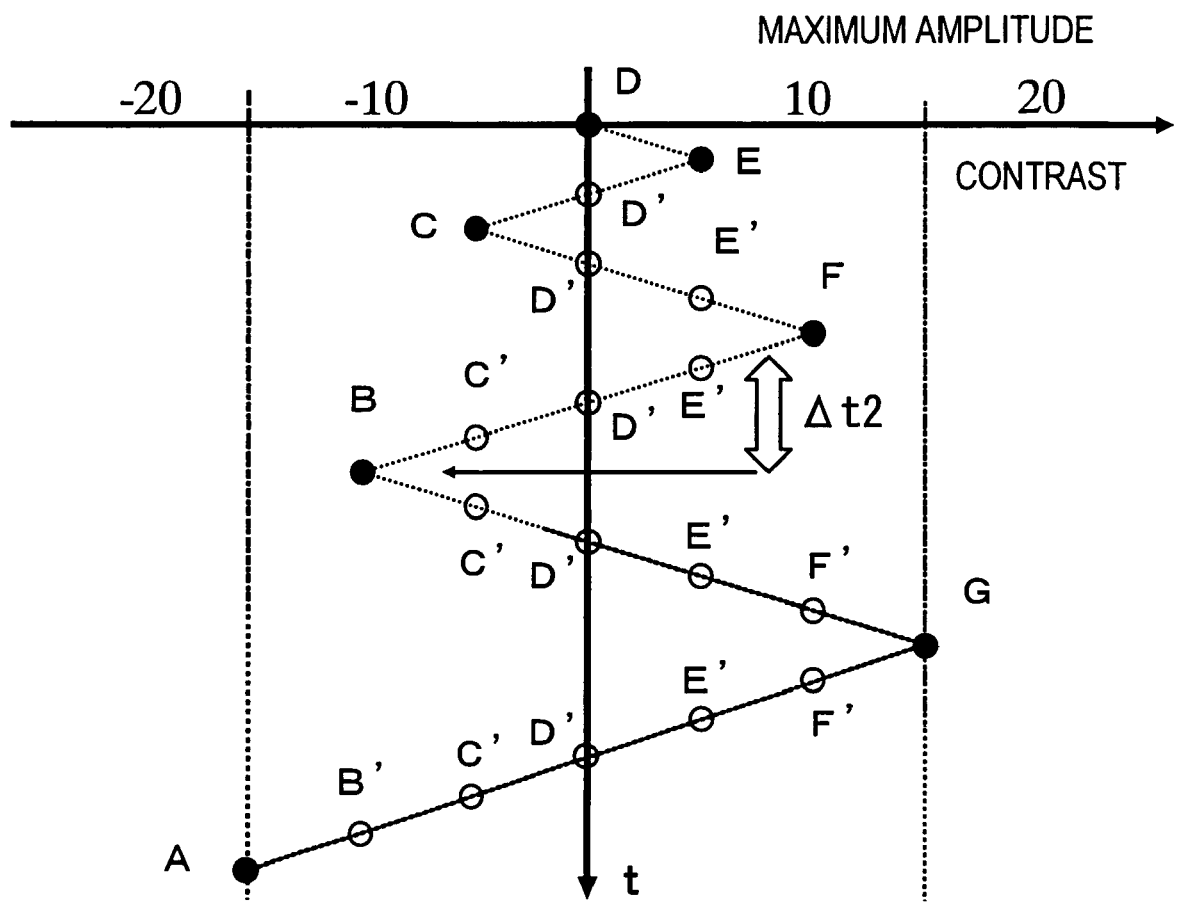
FIG. 5 is a schematic representation showing an image calculation and display timings in a second example of the invention.

FIG. 4 is a conceptual drawing to describe an image display method according to a second example of the invention. FIG. 5 is a schematic representation showing an image calculation and display timings in the example. The example provides an image processing method of displaying a series of images using volume data specified by a contrast value c as a parameter value. The contrast value c is increased or decreased periodically with respect to a reference value, and the amplitude is gradually increased for sequentially generating images corresponding to the contrast values c respectively.

For example, when a series of images provided by changing the contrast value c in a range of −15 to 15 are displayed, starting from an image D corresponding to reference contrast value c=0, which is most important for the user, an image E corresponding to the contrast value c=5 and an image C corresponding to the contrast value c=−5 are generated in this order, and displayed.

Next, an image F corresponding to the contrast value c=10 is generated and displayed. While the images stored in a cache are displayed as images E', D', and C' corresponding to the contrast values c=5, 0, and −5, an image B corresponding to the contrast value c=−10 is generated and displayed.

Likewise, while cached images C', D', E', and F' are displayed, an image G corresponding to the contrast value c=15 is generated and displayed. While cached images F', E', D', C', and B' are displayed, an image A corresponding to the contrast value c=−15 is generated and displayed.

According to the described configuration, the image corresponding to the reference contrast value (c=0) and the image corresponding to the contrast value that is close to the reference contrast value are generated in priority to other images. Then, a range of the contrast value for the image display is gradually widened. Accordingly, the response to the user can be improved. Since an observation object such as an organ is seen differently with the change in the contrast, a precise diagnosis can be conducted.

In the example, when the generated image is stored in the cache and the image corresponding to the specified contrast value is stored in the cache, the corresponding image stored in the cache is displayed. When the corresponding image is not stored in the cache, the corresponding image is generated and displayed. Accordingly, high-speed animation display with a focus on the user-specified important portion can be performed.

In the example, while the image stored in the cache is displayed, an image corresponding to the next contrast value is generated in advance and stored in the cache. As a new image is generated in parallel with the display of the images, the user need not wait until each image is generated as in the related art, and the series of images can be displayed without giving a sense of discomfort to the user.

In the description given above, the projection angle and the contrast value are used as the parameter values, but any parameter may be used as long as it is used in rendering. For example, another parameter may be used such as a magnifying scale power or a camera coordinate. For example, as the camera coordinate is changed in the oscillating manner, overlapped organs can be displayed separately so that a precise diagnosis can be conducted.

Furthermore, a parameter that defines an opacity curve (opacity function) in ray casting method may be changed so as to change the opacity of the CT value indicating a specific organ in a oscillating manner. A one-dimensional parameter, such as either of WW (window width)/WL (window level) value used for the MIP method, etc., that determines a rendering condition when rendering of volume data is performed may be used. Also, a multi-dimensional parameter determined through the one-dimensional parameter maybe used. For the WW/WL value, an intermediate parameter that uniquely defines both the WW and WL values may be used. The WW/WL value is a parameter to adjust the display contrast and brightness in an image represented in grayscale as in an MIP image. For example, when an image is given with the grayscale of 4096 gradation, processing of extracting a range particularly effective for a diagnosis from the image and converting the range into 256 gradation is called a WW/WL conversion. In the WW/WL conversion, a width of the extraction range is called WW (window width) and a center value of the extraction range is called WL (window level) value.

Further, in a fusion image in which a plurality of volume data is displayed at the same time, a synthesizing ratio may be changed. Accordingly, the image to be displayed in priority to other images is changed, and an inspection object can be displayed in a way easy to understand intuitively. Further, a parameter value that determines a color LUT (Look-Up Table) function in the ray casting method may also be changed so as to change a color of an organ for the use in a diagnosis.

Figure 6:
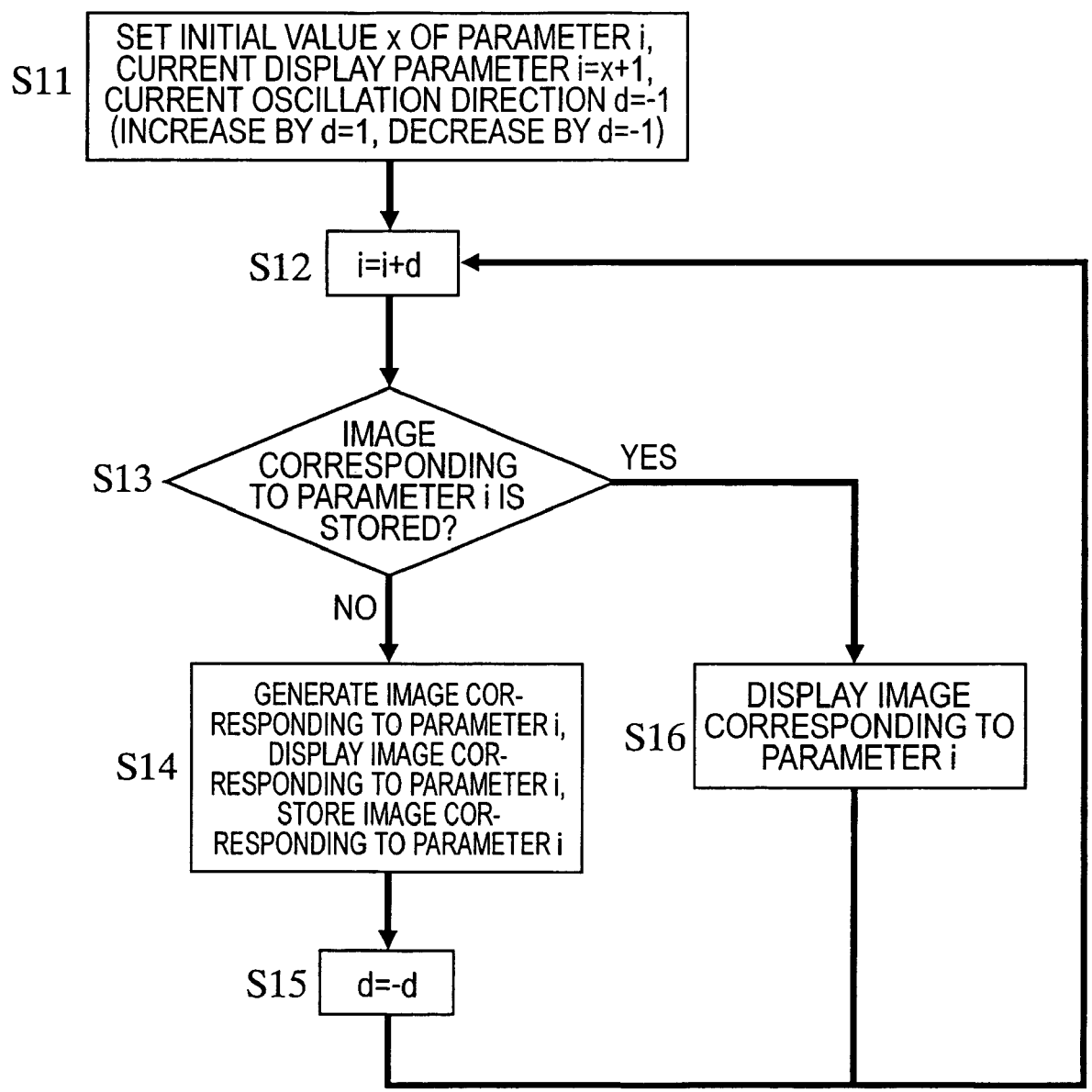
FIG. 6 is a flowchart of a standard case in an image processing method of an embodiment.

FIG. 6 is a flowchart of a standard case in the image processing method of the embodiment. A parameter i is a general one-dimensional parameter including the projection angle θ in the First example and the contrast value c in the Second example. At first, an initial value x of the parameter i is set, and a current parameter i=x+1 and a current oscillating direction d=−1 ("increase" represented by d=1 and "decrease" represented by d=−1) are set (step S11).

Next, i=i+d (step S12) is implemented, and whether or not an image corresponding to the parameter i is stored is determined (step S13). If the image is not stored (NO at step S13), the end of the range of that parameter value for the image display is reached. Thus, the image corresponding to the parameter i is generated, displayed, and stored (step S14).

Next, the oscillating direction is reversed by d=−d (step S15), and the process returns to step S12. On the other hand, if the image is stored (YES at step S13), the stored image corresponding to the parameter i is displayed (step S16). Then, the process returns to step S12 and the processing is continued.

Figure 7:
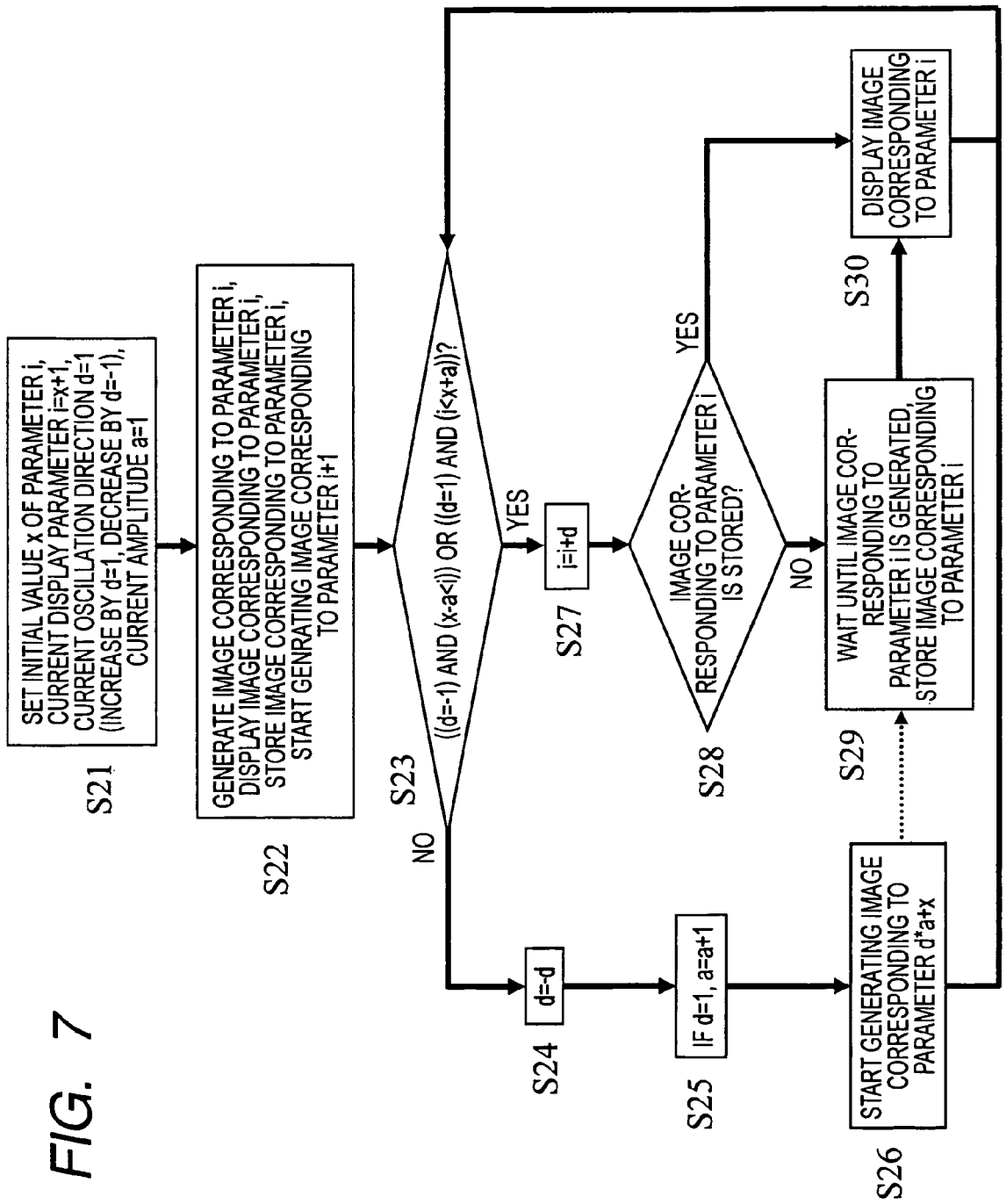
FIG. 7 is a flowchart of an image-generation-in-advance type in an image processing method of an embodiment.

FIG. 7 is a flowchart of an image-generation-in-advance type in the image processing method of the embodiment in which Multi-Thread approach is taken. In this case, an initial value x of the parameter i is set, and a current display parameter i=x+1, a current oscillating direction d=1 ("increase" represented by d=1 and "decrease" represented by d=−1) and a current amplitude a=1 are set (step S21). Next, an image corresponding to the parameter i is generated, displayed, and stored. Then, a generation of an image corresponding to the parameter i+1 is started (step S22).

Next, to determine whether or not the end of the range of that parameter value for the image display is reached, Boolean equation "((d=−1) and (x−a<i)) or ((d=1) and (i<x+a))" is determined (step S23). If the end is not reached (NO at step S23), the oscillating direction is reversed by d=−d (step S24).

Next, if d=1, the amplitude is increased by a=a+1 (step S25), so that the amplitude is increased once per reciprocation. In order to previously start generating the next image of which generation is required, generation of an image corresponding to the parameter d*a+x is started (step S26).

On the other hand, if the end is reached (YES at step S23), i=i+d is implemented (step S27), and whether or not the image corresponding to the parameter i is stored is determined (step S28). If the image is not stored (NO at step S28), generation of an image corresponding to the parameter i should have been started at step S26 (step S22 only at the first time). Therefore, the process waits until the generation of the image is completed, and upon completion of the image, the image is stored as the image corresponding to the parameter i (step S29). Then, the image corresponding to the parameter i is displayed (step S30), and the process returns to step S23 and the processing is continued.

Thus, according to the image processing method of the embodiment, the image corresponding to the initial value of the parameter and the image corresponding to the parameter that is close to the initial value are generated in priority to other images. Then, the range of the parameter value for the image display is gradually widened. Accordingly, a response to the user can be improved.

Moreover, each generated image is stored in a cache, and if the image corresponding to the next parameter value is stored in the cache, the corresponding image stored in the cache is displayed. If the corresponding image is not stored in the cache, the corresponding image is generated and is displayed. Accordingly, high-speed animation display with a user-specified important portion as a center can be performed.

Moreover, while the image stored in the cache is displayed, the image corresponding to the next parameter value is previously generated and stored in the cache. Accordingly, a new image is generated in parallel with the display of the images, so that the user need not wait until each image is generated as in the related art. Also, a series of images can be displayed without giving a sense of discomfort to the user.

Figure 8:
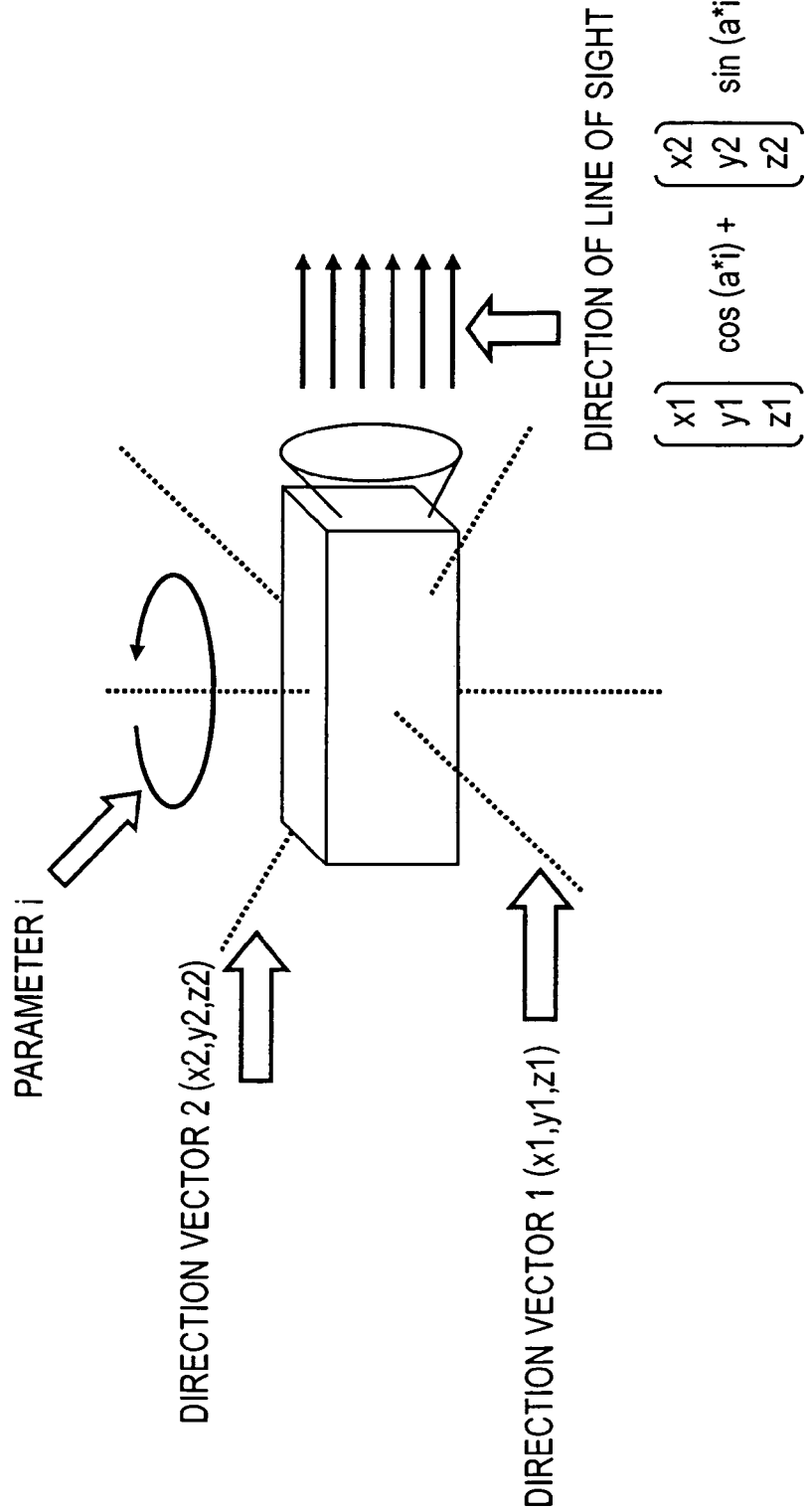
FIG. 8 shows a detailed example of a case where a plurality of variables depends on a parameter value.

FIG. 8 shows a detailed example of a case where a plurality of variables depends on a single scalar parameter value. In order to rotate a line of sight, a parameter i is introduced for a direction vector 1 (x1, y1, z1) and a direction vector 2 (x2, y2, z2). Then, a direction of the line of sight is represented by $$\begin{pmatrix} x1 \\ y1 \\ z1 \end{pmatrix} \cos(a*i) + \begin{pmatrix} x2 \\ y2 \\ z2 \end{pmatrix} \sin(a*i) \qquad \text{[Expression 1]}$$

Here, a is a constant representing a displaying step. Thus, a vector value, which is the direction of the line of sight, can be calculated from a scalar value, which is the parameter i.

Figure 9:
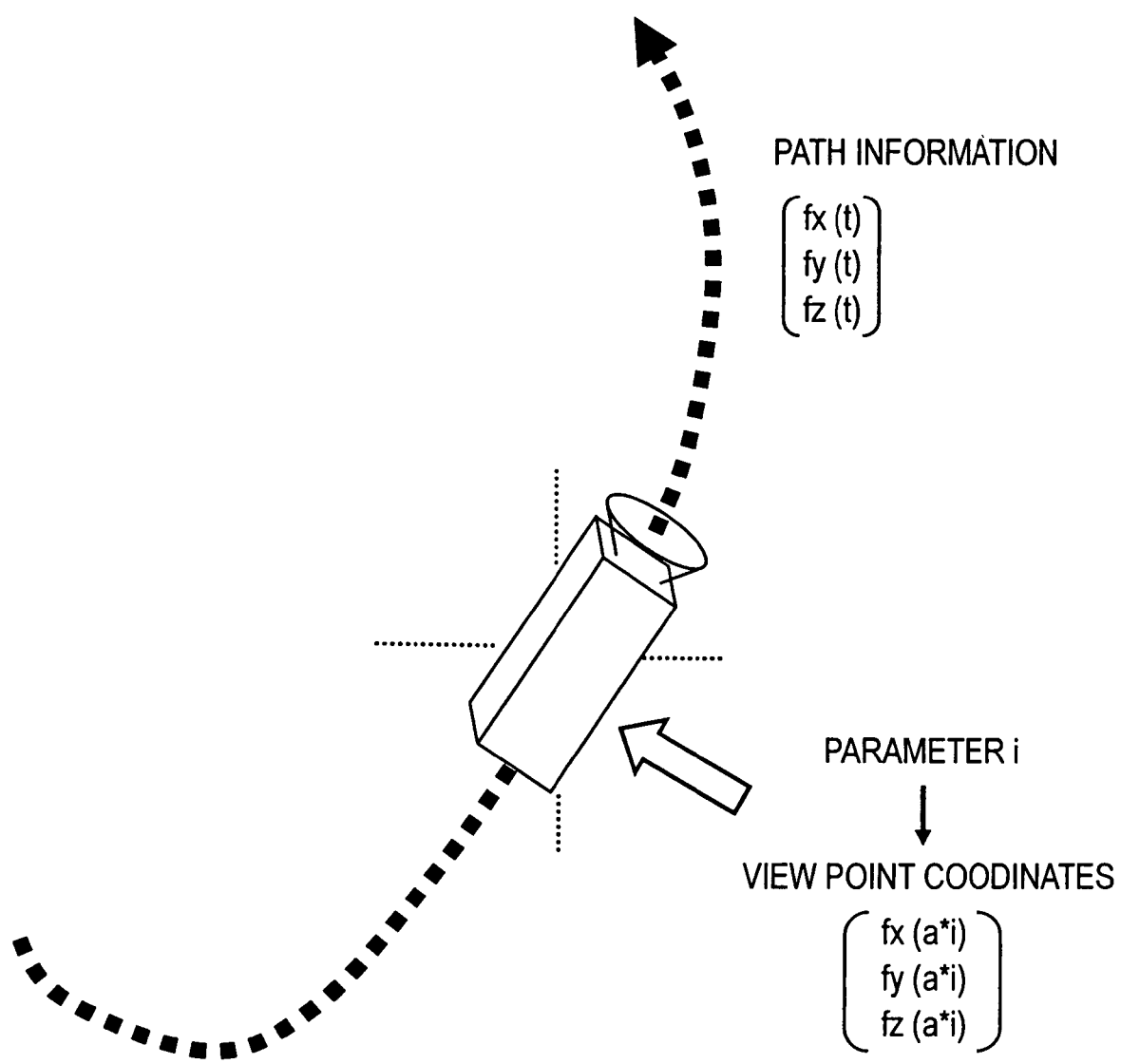
FIG. 9 is a schematic representation showing coordinates of a view point when the view point moves along on a path in a virtual endoscopy display.

FIG. 9 is a schematic representation showing coordinates of a view point when the view point moves along on a path in a virtual endoscopy display. Here, path information is position information where the virtual endoscopy passes through, and is represented as follows:

$$\begin{pmatrix} fx(t) \\ fy(t) \\ fz(t) \end{pmatrix}$$ [Expression 2]

In this case, the coordinates of the view point are represented by a parameter i as follows:

$$\begin{pmatrix} fx(a*i) \\ fy(a*i) \\ fz(a*i) \end{pmatrix}$$ [Expression 3]

Therefore, as the parameter i is changed, the coordinates of the view point can be moved back and forth in the vicinity of an observation object in a oscillating manner. Thus, the positional relationship of the observation object such as an organ can be precisely grasped in the virtual endoscopy, which is an advantage for a diagnosis. Here, the coordinates of the view point represents a projection position from which a virtual ray is projected in volume rendering.

FIGS. 10A to 10E are explanatory diagrams of a case where a parameter defining an opacity curve in the ray casting method is changed so as to change the opacity of CT values indicating a specific organ in a oscillating manner. An opacity value i is a piecewise function defining the opacity for each CT value.

Figure 10A:
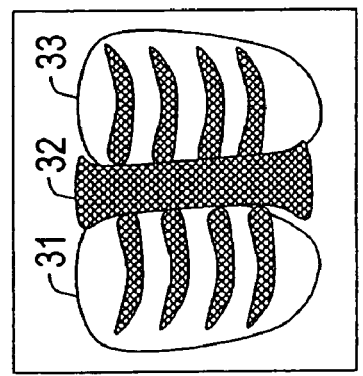
FIGS. 10A to 10E are explanatory diagrams of a case where a parameter defining an opacity curve in ray casting method is changed so as to change opacity of CT values indicating a specific organ in a oscillating manner.
Figure 10B:
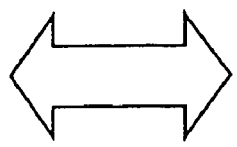
Figure 10C:
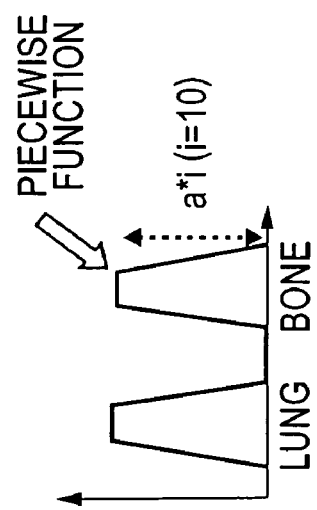
Figure 10D:
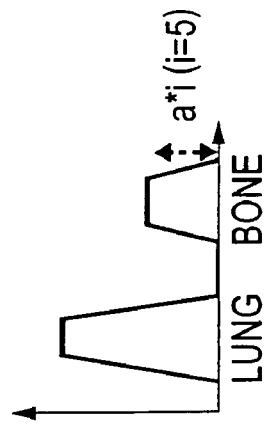
Figure 10E:
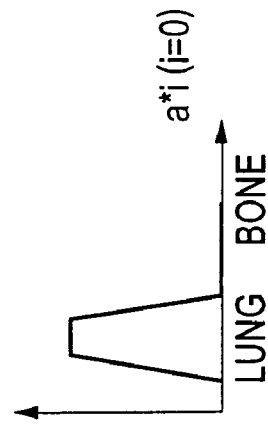
Figure 12:
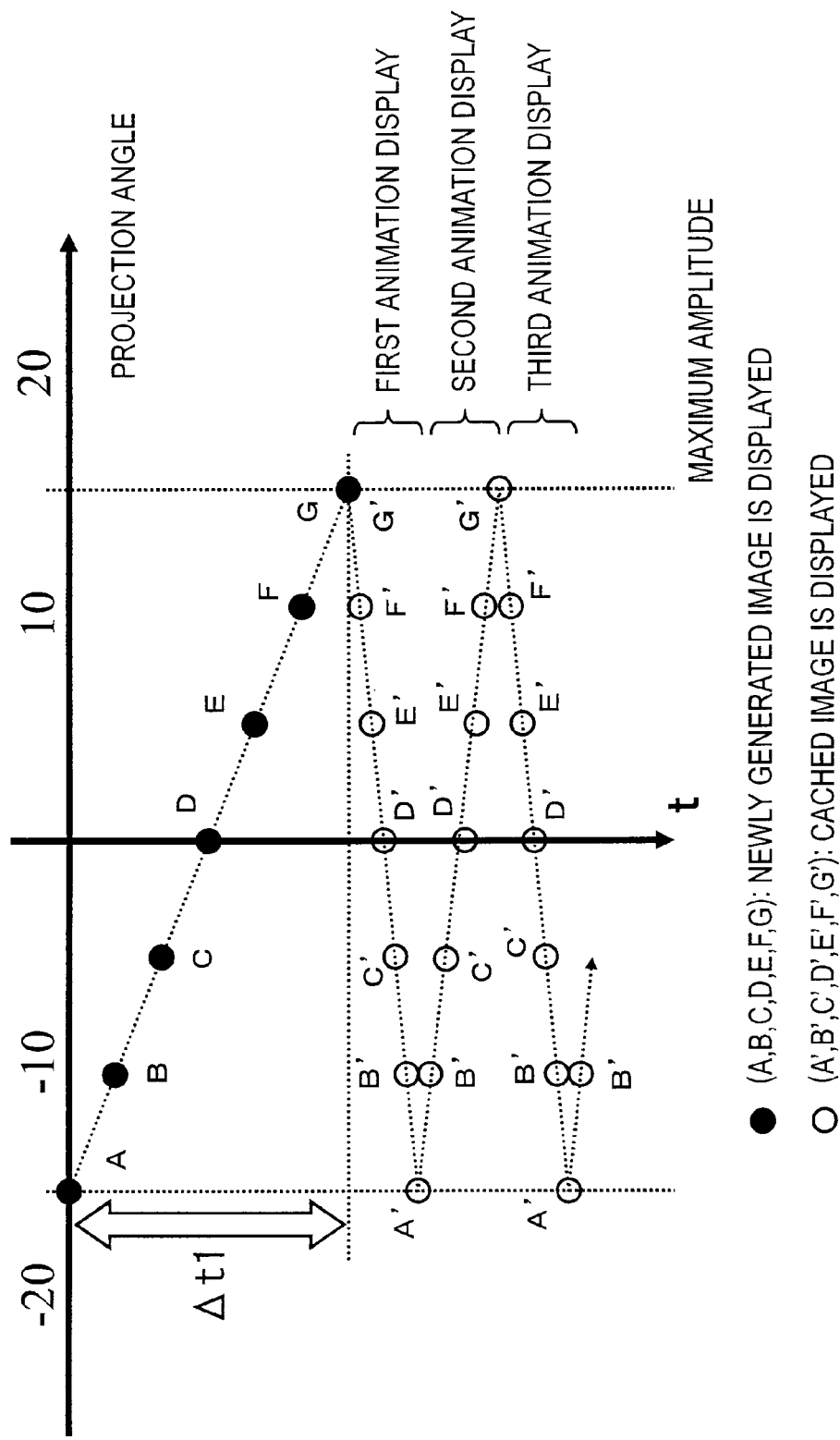
FIG. 12 is a schematic representation showing timings of displaying newly generated images and cached images.

A CT value a of a bone is multiplied by the opacity value i as shown in FIGS. 10C, 10D and 10E, whereby lungs 31, 32 and a bone 32 can be both displayed as shown in FIG. 10A, or only the lungs 31, 33 can be displayed as shown in FIG. 10B. Thus, by changing the opacity of one of the overlapped organs in a oscillating manner, it becomes easy to grasp the positional relationship between the respective organs, which is an advantage for a diagnosis of the observation object.

In the embodiments of the invention, an image corresponding to each value of the parameter is generated and cached. However, the image can be treated as an intermediate data which can be used to create an image to be displayed. Particularly, two-dimensional intermediate data may be generated as an image. Then, it is becomes possible to display an image generated by adding processing having light calculation load, such as scaling up, two-dimensional rotation, parallel move, contrast change, WW/WL (window level: brightness and contrast) parameter change, to the image treated as an intermediate data, while a tumbler display is performed. Accordingly, the cached data can be reused.

In the embodiments of the invention, the MIP method and the ray casting method are illustrated. However, a MinIP (Minimum Intensity Projection) method, a raysum method, or an average value method may be used instead of the MIP method. In the MinIP (Minimum Intensity Projection) method, a minimum value of voxels on a virtual ray is used for display. In the raysum method, an accumulation value of voxels on a virtual ray is used for display. In the average value method, an average value of voxels on a virtual ray is used for display. In addition, any other image processing method may be used as long as the image processing method uses volume data.

In the embodiments of the invention, the WW/WL conversion is applied to the MIP method. However, the WW/WL conversion can also be used in the MinIP method, the raysum value method, and the average value method.

In the embodiments of the invention, one image is generated at a time, but a plurality of images may be generated at the same time. This is effective particularly in a case where the system holds a plurality of processing units.

In the embodiments of the invention, display is performed while the amplitude of the parameter is increased. However, the amplitude of the parameter may be made constant when the amplitude becomes a certain amplitude, or in a certain timing. The user may stop increasing the amplitude of the parameter (stop calculation of the image) at any desired timing. Accordingly, execution of the calculation of an image that is unnecessary for the user can be avoided.

In the embodiments of the invention, the parameter is changed by a fixed value, but the parameter need not be changed by a fixed value. For example, the parameter may be changed by a small value in a range where the parameter is close to the initial value, and the parameter may be changed by a large value in a position where the parameter is apart from the initial value. Accordingly, the images in the proximity of the initial value as the center of display can be presented to the user more intensively.

According to the invention, the image corresponding to the parameter value as a reference and the image corresponding to the parameter value that is close to the reference parameter value are generated in priority to other images. Then, the range of the parameter value for the image display is gradually widened. Accordingly, a response to the user can be improved.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing method comprising:
    setting a reference value of a parameter value for displaying an image;
    sequentially displaying the image with the parameter value;
    oscillating the parameter value around the reference value based on an amplitude of oscillation; and
    sequentially displaying the image corresponding to the parameter value, the image being generated by volume rendering using volume data that is specified by the parameter value,
    gradually increasing the amplitude of oscillation over a period of time so that a peak-to-peak amplitude of resulting oscillations gradually increases over time.

2. The image processing method as claimed in claim 1, wherein when an image corresponding to a changed parameter value is stored in a storage, the stored image is displayed, and
    when the image corresponding to the changed parameter value is not stored in the storage, the image corresponding to the changed parameter value is generated during an interval in which a plurality of stored images are sequentially displayed, and then displayed and stored in the storage after said interval.

3. The image-processing method as claimed in claim 1, wherein a plurality of variables depends on the parameter value.

4. The image processing method as claimed in claim 3, wherein the parameter value is a projection angle of a virtual ray in the volume rendering.

5. The image processing method as claimed in claim 3, wherein the parameter value is a projection position from which a virtual ray is projected in the volume rendering.

6. The image processing method as claimed in claim 5, wherein the projection position is a view point that moves along on a set path.

7. The image processing method as claimed in claim 3, wherein the parameter value determines an opacity function in ray casting method.

8. The image processing method as claimed in claim 3, wherein the parameter value determines a color LUT (Look-Up Table) function in ray casting method.

9. The image processing method as claimed in claim 1, wherein the parameter value determines at least one of a window width value and a window level value being used for an image calculation in MIP (Maximum Intensity Projection) method, MinIP (Minimum Intensity Projection) method, ray-sum method, or average value method.

10. The image processing method as claimed in claim 1, wherein the parameter value is a combining ratio of a fusion image.

11. The image processing method as claimed in claim 2, wherein while the stored image is displayed, the next image to be created is generated and stored in advance, said next image corresponding to an increased amplitude of oscillation.

12. The image processing method as claimed in claim 1, wherein a plurality of the images is generated in parallel based on the respective parameter values.

13. The image processing method as claimed in claim 1, wherein the reference value is set by a user.

14. The image processing method as claimed in claim 1, wherein the image generation is stopped by an instruction from a user.

15. A computer readable medium having a program including instructions for permitting a computer to perform image processing, said instructions comprising:
   setting a reference value of a parameter value for displaying an image;
   sequentially displaying the image with the parameter value;
   oscillating the parameter value around the reference value based on an amplitude of oscillation; and
   sequentially displaying the image corresponding to the parameter value, the image being generated by volume rendering using volume data that is specified by the parameter value,
   gradually increasing the amplitude of oscillation over a period of time so that a peak-to-peak amplitude of resulting oscillations gradually increases over time.

* * * * *

UNITED STATES PATENT AND TRADEMARK OFFICE
CERTIFICATE OF CORRECTION

PATENT NO. : 7,653,231 B2 Page 1 of 1
APPLICATION NO. : 11/415680
DATED : January 26, 2010
INVENTOR(S) : Matsumoto It is certified that error appears in the above-identified patent and that said Letters Patent is hereby corrected as shown below:

Column 2, line 53, please insert -- -10°-- after "10°" and before "-15°",

Column 5, line 44, please replace "-5'" with "-5°",

Column 5, line 55, please replace "D°" with "D'",

Column 7, line 15, please replace the word "maybe" with the words --may be--,

Column 9, line 32, please replace the number "32" with --33--.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

```
PATENT NO.       : 7,653,231 B2                                          Page 1 of 1
APPLICATION NO.  : 11/415680
DATED            : January 26, 2010
INVENTOR(S)      : Kazuhiko Matsumoto
```

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this

Twenty-third Day of November, 2010

David J. Kappos
*Director of the United States Patent and Trademark Office*